United States Patent [19]

Eilentropp

[11] Patent Number: 4,484,022

[45] Date of Patent: Nov. 20, 1984

[54] METHOD OF MAKING TENSILE-, PRESSURE-, AND MOISTURE-PROOF CONNECTIONS

[75] Inventor: Heinz Eilentropp, Wipperfürth, Fed. Rep. of Germany

[73] Assignee: HEW-Kabel, Heinz Eilentropp KG, Wipperfuerth, Fed. Rep. of Germany

[21] Appl. No.: 317,349

[22] Filed: Nov. 2, 1981

[30] Foreign Application Priority Data

Nov. 5, 1980 [DE] Fed. Rep. of Germany ....... 3041657

[51] Int. Cl.[3] ............................................ H02G 15/08

[52] U.S. Cl. .................................... 174/84 R; 29/869; 29/870; 156/49; 174/76; 174/87; 174/93

[58] Field of Search ................... 174/76, 84 R, 87, 93; 29/868, 869, 870; 156/49

[56] References Cited

U.S. PATENT DOCUMENTS

| | | | |
|---|---|---|---|
| 2,958,723 | 11/1960 | Logan et al. | 174/93 |
| 3,143,595 | 8/1964 | Martin | 174/90 |
| 3,247,315 | 4/1966 | Miller | 174/84 R |
| 3,297,819 | 1/1967 | Wetmore | 174/84 R |
| 3,356,551 | 12/1967 | Glenn | 174/84 R |
| 3,578,896 | 5/1971 | Lynch | 174/84 R |
| 3,597,528 | 8/1971 | Penfield | 174/87 |
| 3,777,048 | 12/1973 | Traut | 156/49 X |
| 3,937,870 | 2/1976 | Bumpstead et al. | 174/87 |
| 3,980,806 | 9/1976 | May | 174/90 |
| 4,038,490 | 7/1977 | Miller | 156/49 X |
| 4,091,062 | 5/1978 | Nelson | 156/49 X |
| 4,195,106 | 3/1980 | Brusselmans | 174/84 R X |

FOREIGN PATENT DOCUMENTS

| | | | |
|---|---|---|---|
| 750729 | 11/1970 | Belgium | 174/84 R |
| 2311096 | 10/1974 | Fed. Rep. of Germany . | |
| 201151 | 6/1923 | United Kingdom | 174/84 R |
| 693371 | 7/1953 | United Kingdom | 174/93 |
| 1435560 | 5/1976 | United Kingdom | 174/93 |

*Primary Examiner*—John Gonzales
*Assistant Examiner*—Morris H. Nimmo
*Attorney, Agent, or Firm*—Ralf H. Siegemund

[57] ABSTRACT

A sleeve, terminal body, plug body, or the like receives tubular or ring-shaped, normally solid but thermoplastic filler elements, being traversed by a cable or conductor, particularly a portion from which insulation has been stripped. A plunger-like element receives also the cable or conductor and is inserted in one end of the sleeve, or body, the other end being closed by another plunger or body structure. Upon heating, the filler element melts and the plunger or plungers are forced further in to cause melted filler material to fill all voids; the deformed material resolidifies and seals and bonds all parts together.

17 Claims, 8 Drawing Figures

1
3
6
1
11
8
11
2
5
9
7
4
2

1
3
6
12
13
8
11
10
11
5
12
7
4
2

FIG. 3a
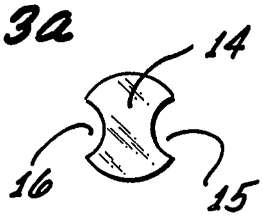
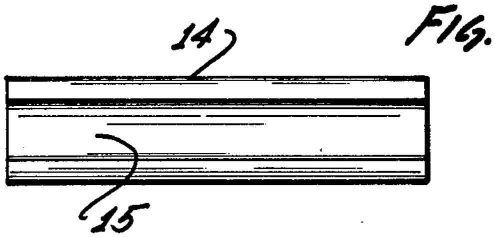
FIG. 3b
FIG. 4
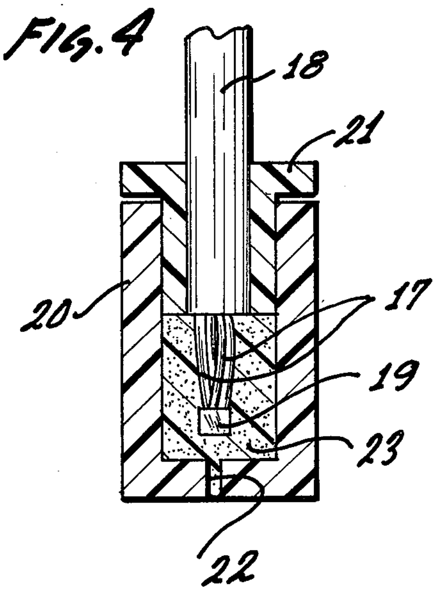
FIG. 5
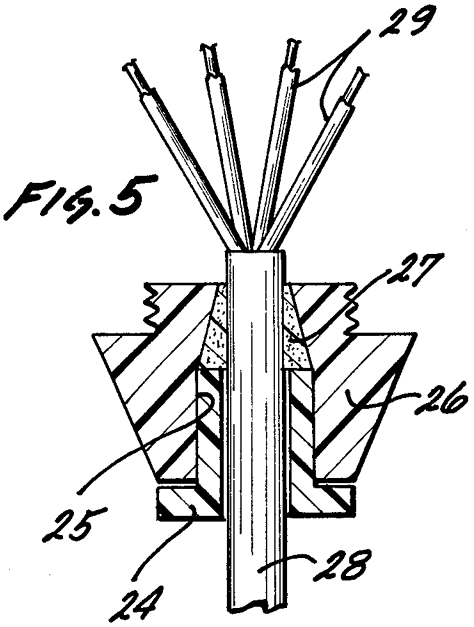
FIG. 6
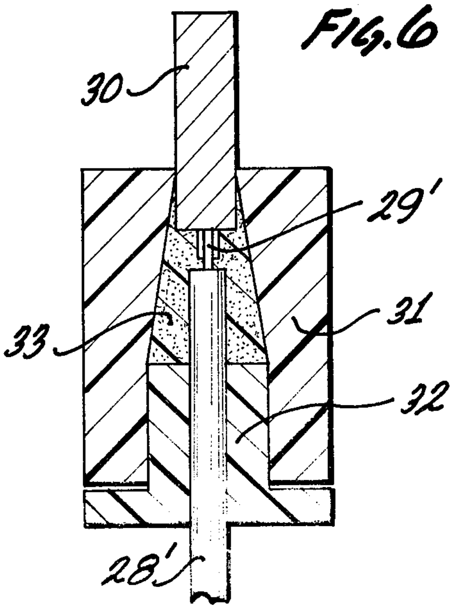
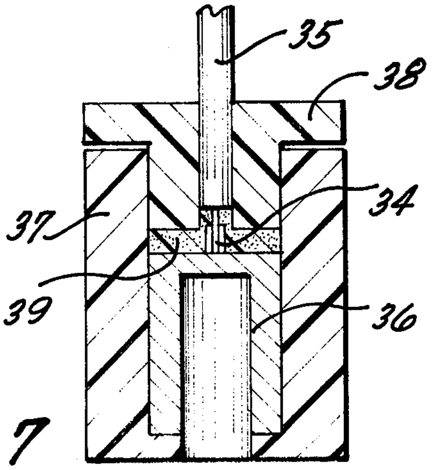
FIG. 7

METHOD OF MAKING TENSILE-, PRESSURE-, AND MOISTURE-PROOF CONNECTIONS

BACKGROUND OF THE INVENTION

The present invention relates to a tension- and moisture-proof and pressure-tight connection for electrical conductors such as in a conductor-to-conductor or conductor-to-terminal connection involving, for instance, mineral-insulated, metal jacket cables, tubular heaters, jacket type thermoelements and conductors with generally a high-temperature-resisting, synthetic insulation.

Electrical cables and conductors are connected and interconnected in various ways. For example, after two electrical conductors have been conductively interconnected, the joint is encased in a sleeve, and the interior of the sleeve casing not occupied by interconnected conductor portions is then filled with a suitable filler, such as a heat-curable or a self-cross-linking casting resin which bonds the sleeve, the conductors, and insulation together. A problem exists hereby that the filler is difficult to inject without inclusion of air bubbles which are detrimental to the mechanical strength of the connection.

Generally speaking, certain materials are used as jackets and/or insulation envelopes; for instance, polyethylene or copolymers of ethylene, or polyvinylchloride are commonly used for this purpose. These materials are also adequate in many cases for obtaining a sufficiently strong bond with other parts. The situation is different for electric conductors or cables operating at high temperatures, such as insulated heating conductors. In this case, one uses polyolefines containing fluoro as insulation. These insulations are difficult to be mechanically connected to other parts in a sufficiently strong and tight manner.

The problem above has been approached by attempting to improve the anti-adhesiveness of, e.g., polytetrafluorethylene, e.g., by means of a surface treatment; but this approach was not successful. Thus, sleeve- and fitting-like connections between two such heating conductors have been made in the past through the use of sleeves made of the same material as the insulation and under utilization of screw connections cooperating with sealing elements. The latter, however, posed problems and moisture may penetrate through and into the connection. Not only does ingress of water interfer with the electrical operation, but it may also destroy the connecting sleeve entirely. Moreover, in explosionproof rooms, only unreleasable sleeve connections are permitted.

DESCRIPTION OF THE INVENTION

It is an object of the present invention to provide a new and improved connection between a cable and another element.

It is a particular object of the present invention to improve sealing, tensile, and pressure proofing of a connection that involves an electrical cable or an insulated conductor.

It is a further object of the present invention to provide an improved moisture-, tension-, and pressure-proof connection to a material of strong antiadhesive properties.

In accordance with the preferred embodiment of the present invention, it is suggested to provide an annular element (sleeve, plug, terminal body, or the like), in which an electrical cable or conductor (or two thereof) is to be inserted and in a particular position therein. An annular, solid, prefabricated filler (sleeve, ring, or the like) is traversed by the cable or conductor and otherwise inserted in the annular element; the filler has a lower melting point than the annular element; a plunger-like element with a flange receives the cable and is inserted to one side of the annular element; and upon heating and melting the filler, the plunger-like element deforms the filler, causing it to embed surrounding cable portions in the annular element; the other end of the latter is either closed by a similar plunger plug, or by tapering of the hollow interior of the annular element, or just by closing the latter off in a blind, bore-like configuration. In spite of, possibly, antiadhesive properties of the cable or conductor insulation (and, possibly, also of the annular element), plunger action ensures firm embedding, tight sealing, and, overall, a tensile-proof connection by the deformed filler after having resolidified.

The sealing may involve sealing against the cable or conductor insulation as well as against bared portions thereof, particularly in the case where the annular element surrounds a cable-to-cable connection or splice, or a conductor-to-conductor connection, e.g., solder joint. The connection can readily be used in an explosion-proofing environment, in an environment exposing the annular element to moisture, for cable splicing, terminal connectors, or just conductor termination; feed-through situations with tension relief on the cable and/or its conductors being fed through, e.g., the wall of a casing; for connection of a conductor end to a male or a female plug. The sealing, etc., should (and will) be of long duration and life.

The principle behind the invention is the fact that originally the "filler" is also an annular element, a tube or a ring, having only roughly a contour that matches those of the parts to which it is to be bonded; the inner diameter permits feed-through of the cable, the outer diameter permits insertion in the annular element. Melting and pressure application by heat and plunger action converts this filler into a fusion or melting adhesive. The plunger acts as a piston, and the annular element becomes a piston chamber; the plunger forces the melted filler into all voids, gaps, etc., in the annular element. Afterwards, the melted material resolidifies and, with the plunger remaining in place, everything in the "piston chamber" is now sealed, even if the surfaces of that "chamber" or parts thereof, are rather antiadhesive. One part or the other may have a relief bore, but certain gaps may also receive melted filler material so that the "chamber" is not to be understood to be a chamber from which there is no "escape" at all.

The annular element must have at least in parts an inner cylindrical configuration matching the corresponding outer configuration of a part of the plunger. The latter may also have a flange, and it is convenient (but not essential) to dimension the parts such that the plunger can be inserted into the annular element until the flange abuts against the latter element, and one is certain that now all voids have indeed been sealingly filled.

The filler element may be provided as a single sleeve or by way of standardized rings, to be assembled in suitable quantities. As soon as heat is applied, the rings will fuse. In conjunction therewith, one may wish to insert also certain guide bodies if the conductor inside the annular element is to run a certain way and is to be kept apart from another one, etc.

One may also use a multiple, concentric assembly of several sleeves of different diameters, and the cap between respective two is sealed in the same manner.

The choice of material is critical to a certain degree. Generally, the filler must have a lower melting point than the surrounding annular element. Since the requisite heat may be applied from the outside, a temperature gradient is to be expected in the annular element so that it will be generally hotter than the filler to be heated. Thus, the melting points must be quite apart in order to make sure that the hotter annular element does not melt while an adequate fluidity of the filler is important so that upon being deformed by the plunger action it will indeed flow into all voids, gaps, cracks, etc.

The annular element (sleeve for splicing of a cable, plug body, terminal body, etc., can be made of metal, ceramic, certain high-melting polyethylene, or other high-melting polyolefin such as silicone, or the same material (fluoro-containing polymer) that may be used as cable insulation.

High-melting (heat-resisting) conductor envelopes may include polyamide, polyimide, polyamidimide, polyacrylensulfide, polysulfone, or polyethersulfone. However, due to their chemically inert properties and high heat resistance fluoro-containing plastics are of particular interest here. In other words, one will apply the invention with advantage whenever a cable or conductor is provided with such a particular insulation. It should be noted that a particular cable insulation is not a feature that is provided as per the invention; rather, these insulations pose existing conditions under which the invention is practiced with advantage. Cable insulations of this nature are, thus, those known more generally under the designation "polytetrafluoroethylene" but is also to include tetrafluoroethylene polymer, having modifying additives; however, in such quantities that the polymer, such as the polytetrafluoroethylene itself, cannot be worked through separation by melting.

The annular element can be made in a variety of ways; if not workable through regular extrusion, one may make use of powder sinter extrusion, the so-called "ram" extrusion.

The filler material is, in general, a thermoplastic material with a relatively low melting point, as defined. Suitable materials are, for example, copolymers of ethylene with vinylacetate, or copolymers on an acrylate or methacrylate basis. The filler material, however, should exhibit some heat resistance. Thus, too low a melting point may not be desirable. Thus, certain fluoropolymers are quite useful, particularly when resistive against other agressive actions and because these polymers have favorable electrical properties. This includes, for instance, polyvinylidene fluoride; poly-tri-fluoro-chlorine-ethylene; the thermoplastic copolymers of vinylidene fluoride and tri-fluoro-chloroethylene. Preferred are copolymers of tetra-fluoro-ethylene with ethylene-hexa-fluoro-propylene as well as perfluoro(-alkyl vinyl) ether with perfluoro-alkyl groups of 1 to 10 carbon atoms, in particular here perfluoro-(propyl vinyl) ether. The last-mentioned copolymers may be built from tetra-fluoroethylene and one or two or three monomeric units of this group), i.e., a ter-polymer or a quater-polymer. In these last-mentioned ter- or quater-polymers, one may include vinylidene-fluoride, tri-fluoro-chloro-ethylene or other fluoro-containing or nonfluorized monomers. Resins of perfluorized monomers are preferred whenever high-temperature resistance and inert properties are desired.

The plunger element is preferably of the same material as the annular element and/or the cable insulation. Identical material is not a prerequisite; but, at least, its resistivity (e.g, mechanical), electrical properties, and the thermal coefficients of expansion should be quite similar.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIGS. 3*a* and 3*b* are respectively end and side views of an insert that may be used in conjunction with cable-splicing as per FIGS. 1 and 2;

FIG. 4 illustrates a cross section of an application of the preferred embodiment for terminating electrical conductors such as in electrical temperature-sensing devices;

FIG. 5 is a cross section through a feed-through fitting with (mechanical) load relief, improved as per the preferred embodiment;

FIG. 6 is a cross section through a connection of a conductor-to-contact pin, enclosed by a plug body and anchored thereto in accordance with the preferred embodiment; and FIG. 7 is a cross section through a similar connection but involving a socket or female plug.

Proceeding now to the detailed description of the drawings, FIGS. 1 and 2 illustrate two cables having respectively conductors 1 and 2 covered, normally, by insulation 3 and 4, such as poly-tetra-fluoro-ethylene. Part of the insulation has been stripped away adjacent to the ends of the conductors to be interconnected.

Figure 1:
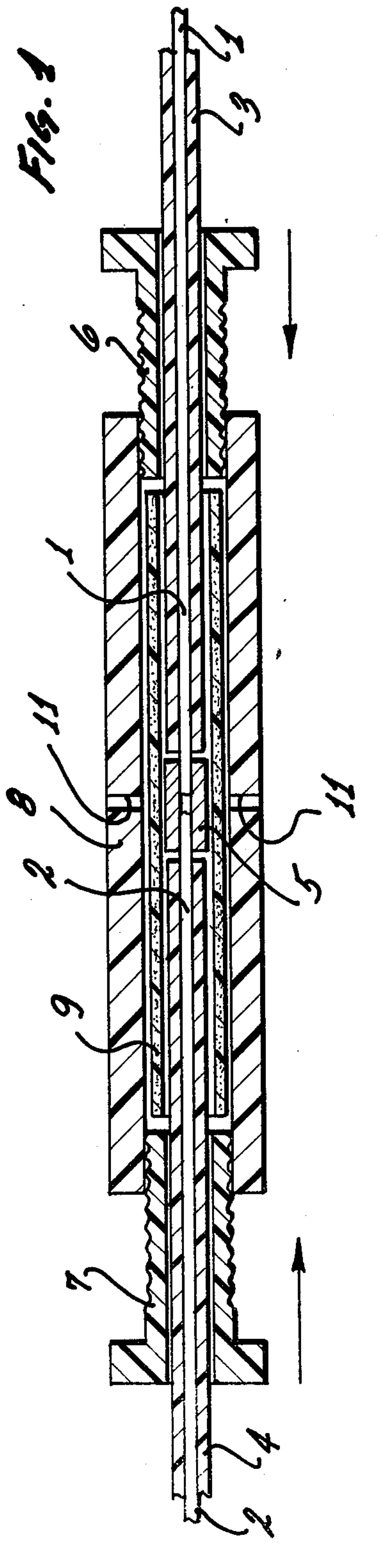
FIG. 1 illustrates a cross section through a connection between two heating conductors and being improved in accordance with the preferred embodiment of the invention for practicing the best mode thereof in this particular environment; the figure shows, in particular, an early phase of making the connection.

A metal sleeve 5 is clamped onto and around the ends of conductors 1 and 2, electrically connecting them to each other. This being, more or less, the "background," the problem at hand is to cover the splicing area of the joint. It is assumed (but not essential) that the insulations 3 and 4 of the cable are of the antiadhesive type.

Prior to clamping the sleeve 5 around the conductor ends, two elements 6 and 7 have respectively been slipped onto the cable ends. These two elements will later serve as plungers and are of a cylindrical configuration with a flange on one end each. Also, a lower sleeve 8 has been slipped onto one of the cables, and a plastic tube 9 has been inserted between the one cable and the sleeve. This tube 9 constitutes the prefabricated annular "filler." Its outer dimensions are, more or less, matching the inner diameter of the splicing and cover sleeve or annulus 8; and the inner diameter of the "filler" tube can be slipped onto the cable insulations with ease. Tube 9 is shorter than sleeve 8; how much shorter will be explained below.

Plunger elements 6 and 7 and sleeve 8 are preferably made of the same insulation material used in the cable, e.g., poly-tetra-fluoro-ethylene. The filler tube 9 is made of a copolymer, such as tetra-fluoro-ethylene-perfluoro(-alkylperfluoro-vinyl) ether. Decisive is that the filler sleeve has a melting or softening point that is considerably below the melting or softening point of elements 6, 7, and 8.

After placing the elements 6 to 9 as described, metal sleeve 5 is clamped around the conductor ends to positively interconnect them; next, sleeves or annular devices 8 and 9 are shifted over the joint in a, more or less, symmetric position relative thereto. The tubular portions of plunger elements 6 and 7 reach into the sleeve 8 facing axially the ends of the shorter filler tube 9. This particular situation is shown in FIG. 1.

As sleeve 8 is now heated by a contact heater, by a furnace or the like, the applied heat should be chosen that sleeve 8 remains rigid and retains its shape, but sleeve 9 begins to flow; plungers 6 and 7 can be pushed inwardly to deform and compress filler tube 9 in order to fill all voids, gaps, and spaced between the elements 6, 7, and 8, on one hand, and elements 1, 2, 3, and 4, on the other hand.

It can readily be seen that the length and thickness of filler 9, as a prefabricated element, should be chosen so that it will, indeed, fill all such gaps after the plungers have been pushed all the way in.

A suitable operating temperature for the materials mentioned above is approximately 350° C. to 380° C. After cooling, the now deformed filler resolidifies and constitutes a filler 10. A tight, moisture-proof sleeve connection of high tensile strength has been obtained. The flowing material of the tube 9 becomes particularly embedded in the zone around the clamping sleeve 5. The thus deformed tube 9 constitutes now a filler and bonding agent 10.

The parts should be matched such that the flanges of elements 6 and 7 abut the ends of the sleeve 8. The latter has control bores 11, and the flowing plastic material of tube 9 should fill these bores, at least partially; and that constitutes an indication that, indeed, the tube 9 material (now 10) has filled all of the gaps in the interior of sleeve 8, including the end gaps, such as 13, between the tubular portions of elements 6 and 7, the cable insulation, and the sleeve 8.

It can readily be seen that this new connection technique is of great advantage. All parts are prefabricated, including the "filler" which is not injected but is a solid tube prior to and during assembly. The various parts, sleeve and supplemental parts (6, 7, and 9) are, more or less, matched to each other and to the dimensions of the cable. Thus, even unskilled workers can make up the connection in a rather simple fashion. Pushing in the plunger elements 6 and 7 until flanges and sleeve 8 abut is convenient but not essential in principle. Decisive is that the tubular portions of plunger elements 6 and 7 provide the requisite compression and deforming pressure of the softened filler annulus or tube 9, acting in a piston-like fashion. The interior of sleeve 8 thus resembles a piston chamber. One can also see that adequate "piston" operation depends upon the fact that the material of filler tube 9 has begun to flow; otherwise, this tube will stop any attempt to push the elements 6 and 7 sufficiently far in. Again, the abutment of flanges and sleeve 8 is a suitable and simple indication that the tube 9 has been softened; if not, more heat must be applied.

FIGS. 3*a* and 3*b* illustrate a supplemental element 14 which is to be used inside filler tube 9 if two conductors, or a conductor and a shield, are to be separately interconnected electrically and kept apart throughout the zone of joining. Shields and conductors, such as heating conductors, run separably in the laterally offset, axial grooves 15 and 16. Upon melting tube 9, the resulting flowing mass 10 will embed everything and fill all portions of grooves 15 and 16 not occupied by interconnected metal elements. Later, resolidification of the molten material embeds these parts and bonds them together.

FIG. 4 illustrates application of the invention to a termination point of thermo-elements or sensors. A cable 18 has conductors or leads 17 whose ends are all clamped together by a suitable clipping device, solder, etc., 19. The end portion is to be held in a blind jacket or sleeve 20 having a bottom, and the said conductor end point is to be held moisture-, pressure-, and tension-proof in that sleeve 20.

A plunger plug element 21 receives the cable 18 and can be inserted in sleeve 20. Previously, a short tube has been inserted in sleeve 20, receiving the clamped-together ends of the conductors 17 and being made of, e.g., a copolymer on the basis of tetra-fluoro-ethylene/-perfluoro (alkyl-perfluoro-vinyl) ether. Again, it should be said that, generally, this filler ring or tube is to be a thermoplastic whose melting or softening point is well below any melting or softening point of annular element 20.

Upon forcing plunger or plug 21 into the sleeve 20, and after that copolymer tube has been heated and softened, the now flowing material fills all of the voids, gaps, and spaces in the container sleeve 20, embedding the conductor ends. Complete embedding is indicated by the emerging of some material through the control opening and bore 22. All parts (20, 21, 17, 18, and 19) are now sealingly, etc., bonded together by the filling material 23.

FIG. 5 illustrates application of the invention to a cable feed-through situation, with cable relief. Reference numeral 26 is a screw element to be screwed into a case, housing, or the like; and a cable 28 is to pass through in a manner that makes sure that any tension load applied e.g. to the cable will not be transmitted to the individual conductors 29. Moisture-proofing is usually an additional requirement and so is, possibly pressure proofing (different environments on the two sides of the feed-through screw element 26).

Again, a tubular "filler" is placed into the opening 25 of element 26, being tapered in parts in this case and loosely receiving cable 28. A plug 24 of the type described also as "plunger element" is inserted, and the device is heated so that upon pushing plug 24 into elements 26 the filler tube melts and becomes a filling 27 occupying the tapered portion and, thus, sealing the cable to the elements 26. This filling now ensures a mechanically positive connection between cable insulation, plug 24, and feedthrough element 26.

Figure 2:
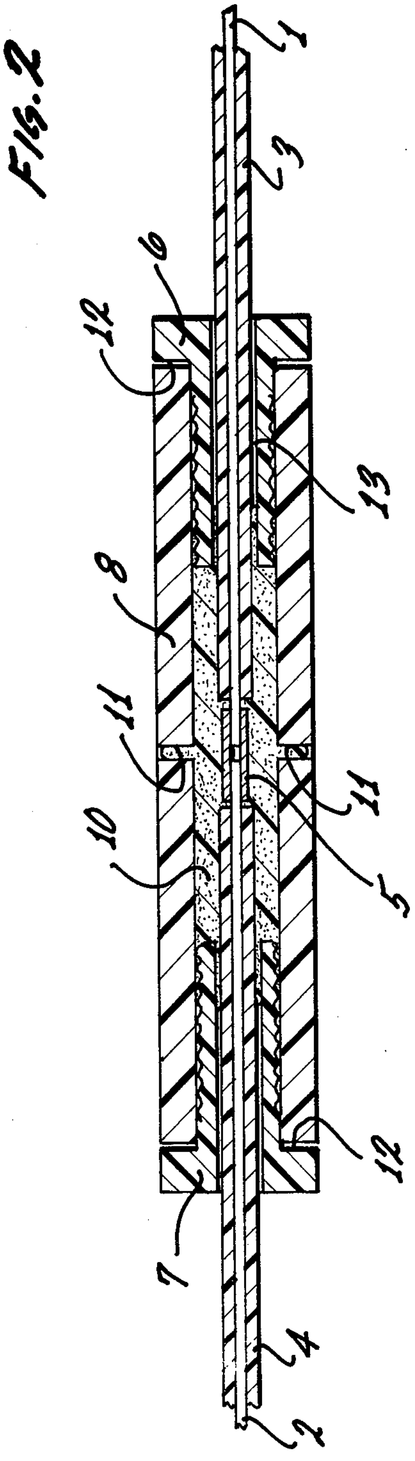
FIG. 2 illustrates a later phase, being, in effect, the completion of the connection as per FIG. 1.

It can readily be seen that the devices of FIG. 4 and 5 differ from the cable splice in FIGS. 1 and 2 in that the latter configuration did use two plungers or plugs whereas in the devices of FIGS. 4 and 5 the annular sleeve element has one end closed differently, either by a transverse wall or bottom or by a tapering configuration through whose narrow end the cable just passes through.

It can readily be seen that the invention refers to various, contoured parts made of a high-melting material and being connected to a cable and/or conductors by means of a low-melting material which, in its original form, was a tubular or ring-shaped insert for the contoured part while, in turn, receiving the cable and/or the conductors.

The invention is also applicable when the insulation is of the metal jacket type with a mineral fiber insulation. The cables and/or conductors may be tubular heating elements, plugs, etc.

FIG. 6 shows such a cable 28' with a conductor 29', being soldered to a contact pin 30. These parts are to be combined with a plug casing or body 31. The body 31 has also a cylindrical bore, being continued in a tapered portion. Following insertion of a tubular filler, the device is heated, and a plug and plunger 32 is inserted to bond the assembly assembly 30-29'-28' to body 31 and to seal the cavity (filler 33) and the exposed electrical solder connection as afore described.

A different plug is shown in FIG. 7; it includes a coupling structure. A cable 35 with conductor 34 is electrically connected (e.g., soldered) with a socket 36. This socket may well be the counter-contact for pin 30 in FIG. 6. A coupling-like case 37 is again made, for instance, of poly-tetra-fluoro-ethylene. Plug 38 received the cable end and acts as a plunger upon, e.g., a perforated, disk-shaped filler which, upon being heated and compressed, is forced into the remaining opening of plug 38 and embeds the connection or joint between conductor 34 and socket 36. Moreover, the socket as a whole is now placed into the body 37 and sealed by means of the melting and resolidified filler 39, being relatively low-melting, as described.

It should be noted that in all of the examples, the conditions of affecting a connector are such that insulation stripping is required, and the bared conductor is connected to another conducting device. This poses special problems of sealing, and care has been taken in all of these cases that the sealing filler embeds the end portion of the remaining insulation.

The various plug and plunger elements are shown to be of cylindrical configuration. FIGS. 1 and 2, however, show that an annular groove pattern has been provided and that the filler material will flow into these grooves. This, in turn, enhances the bonding of the plunger element to the annular element (sleeve, socket, plug, body, etc.). The plunger may actually be slightly tapered because, for reasons of bonding, it is desirable that some material flows into this adjacent gap in a backward or reverse extrusion-like fashion.

The invention is not limited to the embodiments described above; but all changes and modifications thereof, not constituting departures from the spirit and scope of the invention, are intended to be included.

I claim:

1. The method of making a moisture-, pressure-, and tension-proof connection which includes at least one element, comprising the steps of:

providing an annular element to which the connection is to be made and being made of a relatively high-melting material;

providing one or more of a generally annular thermoplastic filler being a separate component and having a melting point below the melting point of said element, but being normally solid;

inserting the element in the filler and in a position to be sealed, and inserting the filler in said annular element so that the element has a particular concentric position in relation to the annular element, the annular element at least in parts surrounding the element and being radially spaced therefrom;

heating the annular element and applying axial pressure to the filler, axial with respect to the annular element, pressure being applicable to the filler on account of the radial spacing between the element and the annular element, so that the filler will melt but not the annular element, and the filler is deformed to fill all voids in the interior of the annular element so as to seal the element and the undeformed annular element so that the element is firmly connected to and sealed against the annular element.

2. A method as in claim 1, the element being one of two electrical conductors, both being insulated, the method including interconnecting the conductors, the annular element being a sleeve, the filler being a sleeve or several disks.

3. A method as in claim 1, using as the annular element a tetra-fluoro-ethylene polymer.

4. A method as in claim 1 or 3, using a filler being a fluoro-containing polymer.

5. A method as in claim 4, using a filler being a copolymer of the tetra-fluoro-ethylene and of a perfluoro (alkyl vinyl) ether with 1 to 10 carbon atoms in the perfluoroakyl chain.

6. The method as in claim 1, wherein the element is an insulated electrical conductor, the seal being at least in parts made with insulation on the conductor.

7. A connection which includes at least one component or element, comprising:

an annular, high-melting element, one of the components or elements being inserted in the annular element in a particular position;

a deformed annular filler embedding a portion of the one component or element in the annular element on account of the deformation, the annular element being radially spaced from the component or element; and a plug element traversed by the one element or component and having a plunger portion and a flange inserted in the annular element, the plunger portion having axially compressed the filler when melted to obtain a sealed, moisture-proof, gas-tight, and tension-proof bond and connection between the plug element, the annular element, and the one element or component portion therein.

8. A connection as in claim 7, the annular element being a sleeve, there being two cables, constituting said element, both cables being inserted in the sleeve and having their respective conductors interconnected, a second plug element, traversed by the second cable, the plug elements being inserted in the sleeve from opposite ends, the filler being between the plug elements and embedding and sealing the conductors as interconnected.

9. A connection as in claim 7, the annular element being a blind sleeve, the element being a cable having a conductor terminated in the blind sleeve.

10. A connection as in claim 7, the annular element having a tapered interior portion occupied in parts by the filler.

11. A connection as in claim 7 or 10, the annular element being a feed-through body for a cable as one of the elements.

12. A connection as in claim 7 or 10, the element being a cable having a conductor connected to a contact, the zone of connection being embedded in the filler.

13. A connection as in claim 7, the annular element having at least one relief opening filled partially by a filler material.

14. A connection as in claim 7, the plunger being cylindrical or slightly tapered.

15. A connection as in claim 7, the plunger having annular grooves.

16. A connection as in claim 7, the one element being a cable having a conductor.

17. A connection as in claim 16, the conductor being connected to a contact, the connection being embedded in the compressed and deformed filler.

* * * * *